E. HOEHN.
GLOBE VALVE OR WATER-COCK.
No. 191,963. Patented June 12, 1877.
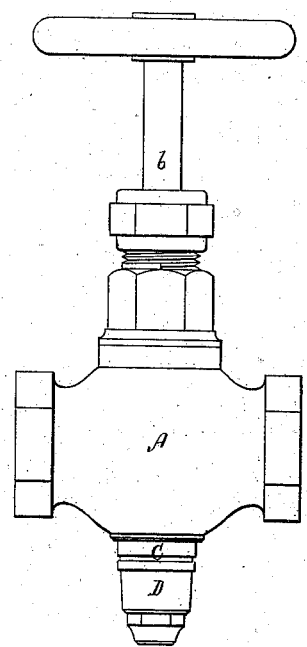
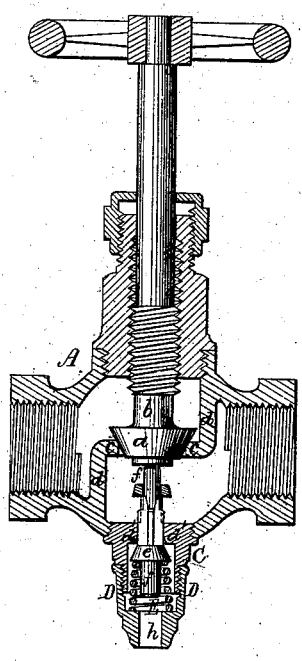

UNITED STATES PATENT OFFICE.

ERNEST HOEHN, OF LAWRENCE, MASSACHUSETTS.

IMPROVEMENT IN GLOBE-VALVES OR WATER-COCKS.

Specification forming part of Letters Patent No. 191,963, dated June 12, 1877; application filed May 17, 1877.

*To all whom it may concern:*

Be it known that I, ERNEST HOEHN, of Lawrence, of the county of Essex and State of Massachusetts, have invented a new and useful Improvement in Globe-Valves or Water-Cocks; and do hereby declare the same to be fully described in the following specification and represented in the accompanying drawings, of which—

Figure 1 is an elevation, and Fig. 2 a longitudinal section, of a globe-valve provided with my invention, whose object is to enable an eduction-pipe leading from such globe-valve to be freed from water, in order to prevent such water from becoming frozen within such pipe and bursting it.

In carrying out my said invention I combine, with the globe valve or cock, a waste-educt and a valve thereto, so arranged and applied as to cause the said valve to be opened or moved off its seat by the main valve of the cock while the latter valve may be in the act of being closed.

In the drawings, A denotes an ordinary globe valve or cock, of which $a$ is the valve, $b$ its stem, and $c$ its seat, the latter being in the divisional partition $d$.

An educt, C, provided with a valve-seat, $d'$, and also with a valve, $e$, thereto, to open downward, and fixed to a stem, $f$, is screwed into the lower part of the case of the cock A, and directly underneath the main valve $a$. This educt, open at its lower end, has a chambered cap, D, (also open at its lower end, as shown at $h$,) screwed on it and against a tapering helical spring, E, arranged in the educt C, and to act against the valve $e$ with force sufficient to close it upon its seat, and keep it so against the pressure of water in the cock when such cock may be open.

The waste-educt valve or its stem should be so arranged as to cause or enable the main valve or a projection therefrom, while such main valve may be in the act of being forced toward its seat, to open the said educt-valve, or press or cause it to be moved off its seat. On the main valve being closed and the educt-valve being opened, any water that may be in the conduit leading from and in advance of the globe-valve will flow or waste out of such conduit, or escape therefrom through the educt.

My improved globe-valve is intended for use in the water-supply or induction pipe of a building. While the valve or cock may be open the spring of the educt-valve will keep the latter closed against the pressure of the water. On the main valve being closed the waste-educt valve will be opened, so as to allow the escape of water, as hereinbefore explained, and, as a consequence, prevent the service-pipes from being burst by water remaining and being frozen in them.

I do not claim a globe-valve having a waste-valve and educt arranged below its main valve, and the stem of such main valve provided with a closing-spring arranged in a chamber over the valve-chamber, and opening therein, all as shown in the Patent No. 142,521, as, with my construction of globe-valve, I dispense with such auxiliary chamber and closing-spring, and thereby avoid the danger of their becoming choked by deposits, so as to interfere with the correct operation of the valve. I provide the stem of the valve with a male screw to screw into a nut screwed into the valve-case, which constitutes a cap thereto, all being as shown in Fig. 2 of the drawing. Thus my valve is not closed by a spring and a valve-stem liable to be choked by deposits, so as to prevent it from operating the auxiliary or waste valve.

I therefore claim—

The improved globe-valve, as described, provided not only with the waste-educt and valve and a closing-spring, arranged as shown, but having to its main-valve stem $b$ and the cap of the case screws, as shown, for operating such main valve and stem, all being as represented.

ERNEST HOEHN.

Witnesses:
WM. S. KNOX,
EDWARD HILBERT.